April 19, 1955  R. I. HUFFMAN  2,706,766
SOLE PLATE FOR SADIRONS
Filed April 22, 1950

INVENTOR.
Russell I. Huffman.
By Bair, Freeman & Molinare
Attys.

United States Patent Office 2,706,766
Patented Apr. 19, 1955

2,706,766

SOLE PLATE FOR SADIRONS

Russell I. Huffman, Dover, Ohio, assignor to Knapp-Monarch Company, St. Louis, Mo., a corporation of Delaware Application April 22, 1950, Serial No. 157,609

1 Claim. (Cl. 219—25)

This invention relates to a sole plate for sadirons or a heating plate of any kind for any type of electrical appliance where it is desirable to facilitate the conduction of heat from a heating element to the sole plate or heating plate of the appliance.

The main object of the invention is to facilitate the conduction of heat from a heating element to a heated element and at the same time evenly distribute the heat of the heating element to the heated element.

Another object is to provide a means which is simple and inexpensive to accomplish the foregoing object and which can be accomplished in a number of ways such as providing a copper-clad heated element or a layer of copper between a heating element and a heated element, such layer of copper being a piece of sheet copper, sprayed molten copper, copper plating, or the provision of copper-clad steel or other metal as the heated element so that the copper thereof serves as the heat transferring and distributing medium.

A further object is to provide a practical construction for using stamped steel as a sole plate of a sadiron or a heating plate of an electrical appliance, stamped steel in itself being subject to uneven heat distribution but capable of being finished smoothly with a minimum of equipment in production and substantially no losses as in the case of cast iron sole plates and heating plates or those made of cast aluminum.

With these and other objects in view, my invention consists in the construction, arrangement and combination of the various parts of my sole plate for sadirons, whereby the objects contemplated are attained, as hereinafter more fully set forth, pointed out in my claim and illustrated in the accompanying drawings, wherein:

Figure 1:
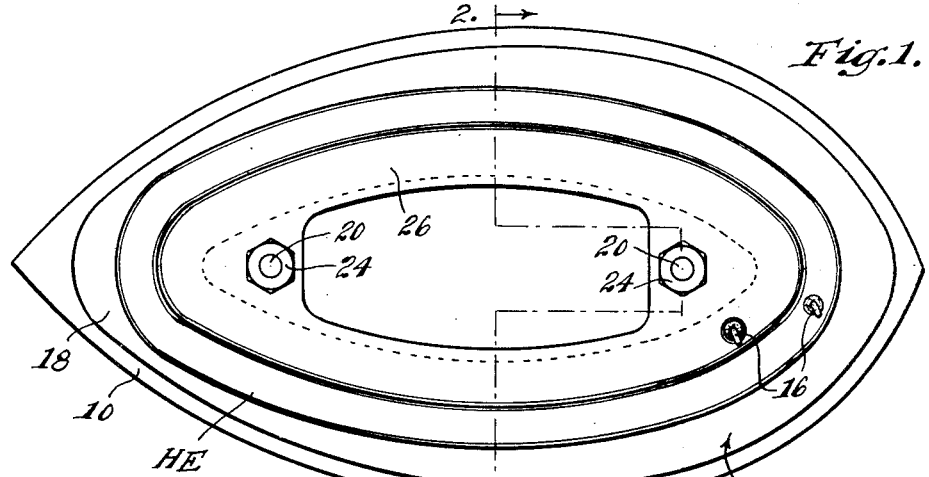
Figure 1 is a plan view of a sole plate embodying my invention and showing a heating element in association therewith in order to illustrate one application of the invention.

On the accompanying drawings I have used the reference numeral 10 to indicate the sole plate for an electrically heated iron. Heretofore these sole plates have been made of cast iron which is relatively expensive and which usually results in at least a 25% loss due to blow holes in the casings. Cast iron sole plates are difficult to finish properly and smoothly as required for sadirons. Cast aluminum has also been used for sole plates. This finishes relatively easy but the melting point is so low as to soften the aluminum under extreme temperature conditions as encountered at times in the use of electric sadirons. Also the surface is so soft that even after being properly finished and polished it is easily scratched and the purpose of finishing and polishing is thus defeated. The aluminum can be plated with chrome or the like which hardens the wearing surface but this too is expensive.

On the other hand, a stamped steel sole plate is inexpensive to produce, is relatively hard so as to stand up well under wear and can be finished and polished quite smoothly with a minimum of equipment at the factory. The surface is thereafter not easily scratched. Therefore a stamped steel sole plate can be produced economically. This applies also to heating plates of other electrical appliances such as electric hot plates, stoves and the like.

The one drawback with stamped steel is that when a heating element is arranged in contact therewith, the steel develops hot spots or a heat pattern that is greater wherever the heating element contacts it. Cast iron and aluminum are not subject to this. Cast iron and aluminum distribute the heat more evenly but I have found that a stamped steel plate can also be made to distribute the heat evenly if a layer of copper is interposed between the heating element and the plate. Thus inexpensively produced and finished stamped steel plates can be efficiently used if such layer of copper is provided.

Figure 2:
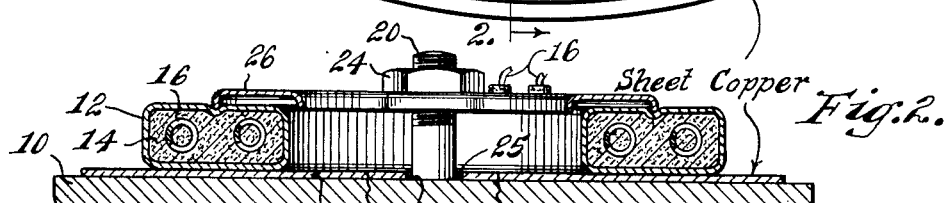
Figure 2 is an enlarged sectional view on the line 2—2 of Figure 1.

By way of one disclosure, Figures 1 and 2 show a copper sheet 18 for this purpose. The heating element is indicated at HE and consists of the usual metal sheath 12 filled with insulating material such as a suitable ceramic 14 in which the resistance wire 16 is imbedded. The heating element may be held against the copper sheet 18 by means of a pressure plate 26 and studs 20 welded to the sole plate at 22 as shown in the central portion of Figure 2. Nuts 24 on the studs hold the pressure plate and heating element in position, and clamp them against the sheet 18 and the sheet in turn against the sole plate 10. The sheet is provided with openings 25 for the bolts 20. The sheet copper 18 is perhaps the least expensive method of accomplishing the desired results.

Figure 3:
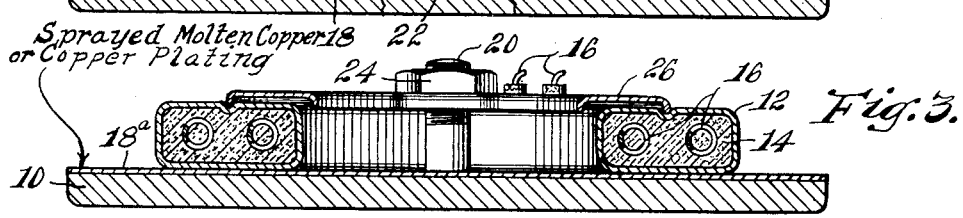
Figures 3 and 4 are similar sectional views showing different arrangements for accomplishing substantially the same results as with the construction of Figure 2.

In Figure 3 I show a modification in which in place of the copper sheet 18 of Figure 2 the top of the sole plate 10 is either sprayed with molten copper or is copper-plated as indicated at 18a. This plating serves to facilitate the transfer of heat and causes substantially even distribution of the heat from the heating element over the sole plate.

Figure 4:
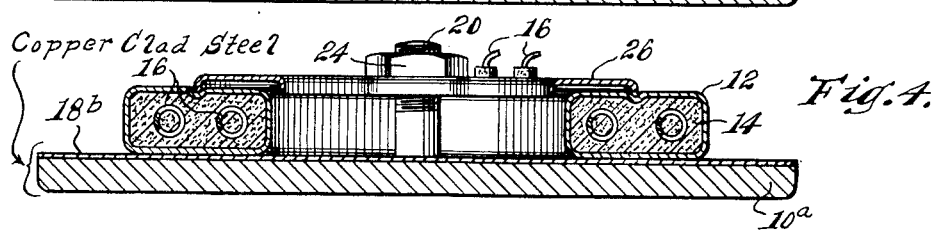

Another arrangement is shown in Figure 4 in which a sole plate 10a is provided. Instead of being ordinary stamped steel as in Figures 2 and 3, the plate 10a is copper-clad steel, that is, it is steel clad with copper on one surface which of course is the surface next to the heating element. The copper portion of the copper-clad steel is indicated as 18b. Copper-clad steel is steel on which a layer of copper has been deposited and bonded thereto by pressure during the rolling process. Again an arrangement is disclosed which I have found equally as effective as those disclosed in Figures 2 and 3 to transfer the heat from the heating element to the sole plate and evenly distribute the heat so as to prevent hot spots in the heat pattern of the sole plate.

Figure 5:
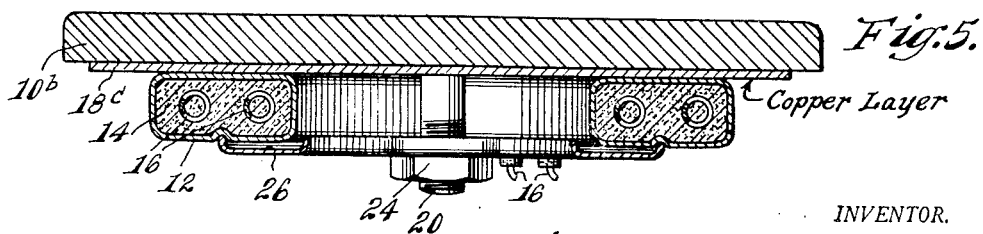
Figure 5 is a similar sectional view through a heating plate of an electric stove or the like showing the invention applied thereto.

The present invention is not limited to sole plates in sadirons. It may also be used in connection with other electrical appliances wherein it is desirable to transfer heat from a heating element to a heated element. In Figure 5 a heating plate 10b is shown which may constitute the top of a hot plate or electric stove. The layer of copper 18c may be a copper sheet, sprayed molten copper, copper plating, or the element 10b may be copper-clad as described in connection with Figure 4, the copper in this instance being on the lower surface of 10b and the heating element being below 10b in the usual arrangement found in electric hot plates and stoves.

I have found that the manufacturing cost of sole plates and other heating appliances can be greatly reduced with the construction disclosed. Stamped steel plates which can be economically produced are suitable to use when the layer of copper is interposed between the heating element and the plate in one of the various arrangements disclosed. The resulting product has all the advantages of cast iron and cast aluminum heated plates without some of their disadvantages and the only disadvantage of stamped steel (uneven heat distribution) is overcome by the layer of copper interposed between it and the heating element.

Some changes may be made in the construction and arrangement of the parts of my sole plate for sadirons without departing from the real spirit and purpose of my invention, and it is my intention to cover by my claim any modified forms of structure or use of mechanical equivalents which may be reasonably included within their scope.

I claim as my invention:

The method of making an electrically heated sadiron which comprises providing a sheet of steel, depositing and bonding a layer of copper on the steel by pressure rolling, stamping a copper-clad sole plate from the steel sheet, and placing the copper-clad surface of said sole plate in contacting engagement with a heating element whereby the copper facilitates efficient transfer and uniform distribution from the heating element to the sole plate.

References Cited in the file of this patent

UNITED STATES PATENTS

| | | |
|---|---|---|
| 590,916 | Snyder et al. | Sept. 28, 1897 |
| 625,117 | Martin | May 16, 1899 |
| 811,954 | Richardson | Feb. 6, 1906 |
| 2,257,451 | Barnes | Sept. 30, 1941 |
| 2,427,379 | Ashbaugh | Sept. 16, 1947 |
| 2,474,039 | Davignon | June 21, 1949 |